United States Patent [19]

Grant

[11] 3,976,753

[45] Aug. 24, 1976

[54] METHOD OF SYNTHESIZING TRIAZANIUM PERCHLORATE MONOHYDRATE

[75] Inventor: Louis R. Grant, Los Angeles, Calif.

[73] Assignee: Rockwell International Corporation, El Segundo, Calif.

[22] Filed: Sept. 16, 1974

[21] Appl. No.: 506,155

Related U.S. Application Data

[63] Continuation-in-part of Ser. No. 302,372, Oct. 30, 1972, abandoned.

[52] U.S. Cl. .................................. 423/351; 423/386
[51] Int. Cl.$^2$ ......................................... C01B 21/00
[58] Field of Search ........... 423/351, 371, 395, 476, 423/386; 260/583 R, 583 B

[56] References Cited
OTHER PUBLICATIONS

Gosl, Angew. Chem., 74, Jan. 1962, p. 470.

Linre et al. I, Z. fur Natur Forschung, 27b, pp. 1005–1006, Aug. 1972.

Linre et al. II, Z. Anorg. Allg. Chem., 1970, 377(2), pp. 139–143.

*Primary Examiner*—Oscar R. Vertiz
*Assistant Examiner*—Eugene T. Wheelock
*Attorney, Agent, or Firm*—L. Lee Humphries; Robert M. Sperry

[57] ABSTRACT

Triazanium perchlorate monohydrate is disclosed as a new composition of matter, together with a method of snythesizing such salts by amination of hydrazines by hydroxylamine-O-methylsulfonate.

1 Claim, No Drawings

METHOD OF SYNTHESIZING TRIAZANIUM PERCHLORATE MONOHYDRATE

This invention herein described was made in the course of or under a contract or subcontract thereunder, (or grant) with the Department of the Navy.

This application is a continuation-in-part of Ser. No. 302,372, filed on Oct. 30, 1972, and now abandoned.

BACKGROUND OF THE INVENTION

1. Field of Invention

This invention relates to compositions of matter and is particularly directed to triazanium perchlorate monohydrate and a method of synthesizing such salt.

2. Prior Art

Compositions of matter which contain high percentages of nitrogen have been found to be extremely useful in formulating energetic materials, such as solid propellants, explosives and the like. A high nitrogen content usually indicates the presence of N—N bonds and, less often, amine or related functional groups. Representative of materials that possess high nitrogen content are the hydrazines, aminoguanidines, aminotetrazoles and their salts. These materials have been the subject of numerous investigations.

In recent years, reports have appeared concerning the preparation of simple dialkyl-substituted triazanium salts. In addition, the synthesis of several 2,2-dimethyltriazanium salts; i.e., 2,2-dimethyltriazanium sulfate, nitrate and perchlorate have been reported. On the other hand, no thermally stable unsubstituted triazanium salts have been known heretofore.

BRIEF SUMMARY AND OBJECTS OF INVENTION

The disadvantages of the prior art are overcome and stable unsubstituted triazanium perchlorate monohydrate has been synthesized by amination of hydrazine with hydroxylamine-O-methylsulfonate.

Accordingly, it is an object of the present invention to provide a new composition of matter.

Another object of the present invention is a method of synthesizing triazanium salts.

An additional object of the present invention is to provide a thermally stable unsubstituted triazanium salt.

A specific object of the present invention is to provide triazanium perchlorate monohydrate as a new composition of matter.

An additional object of the present invention is to provide a method of producing triazanium salts, said method comprising the step of aminating hydrazines with hydroxylamine-O-methylsulfonate.

These and other objects and features of the present invention will be apparent from the following detailed description.

DETAILED DESCRIPTION OF THE INVENTION

The stability of aqueous solutions of dialkyltriazanium salts is known to be PH dependent. The only previously known unsubstituted triazanium salt, $N_3H_6^+HSO_4^-$, is thermally unstable and its instability, by extrapolation, is believed due to the presence of the acidic bisulfate ion. The use of hydroxylamine-O-sulfonic acid as an aminating agent for unsymmetrical dimethylhydrazine (UDMH) in a 1:1 molar ratio does not result in the isolation of 2,2-dimethyltriazanium bisulfate, apparently due again to the acidic nature of the product. However, if the molar ratio of hydroxylamine-O-sulfonic acid to UDMH is 2:1, good yields of the neutral salt 2,2-dimethyltriazanium sulfate are obtained.

By these examples it was considered that thermally stable unsubstituted triazanium salts could be obtained providing that an aminating agent was used which did not yield a triazanium salt containing an acidic anion. Therefore, a preparation method was devised for the synthesis of hydroxylamine-O-methyl- sulfonate. This material served as an aminating agent for hydrazine to give triazanium methylsulfonate. A metathetical reaction of this salt with barium perchlorate yielded a material which was indicated to be triazanium perchlorate monohydrate. However, a pure sample of this material was not obtained, and attempts to dehydrate the monohydrate only gave unidentified decomposition products.

EXAMPLE I

The synthesis of a stable unsubstituted triazanium perchlorate was accomplished by first developing a preparative method for the aminating agent $CH_3SO_3NH_2$. This material was shown to form the derivative triazanium methylsulfonate, $N_3H_6SO_3CH_3$, when reacted with hydrazine. A metathetical reaction of the methylsulfonate salt with barium perchlorate gave triazanium perchlorate.

All solution preparations were conducted in a nitrogen-filled dry box. In general, solutions of the aminating agent were prepared in a three-neck, round-bottom flask fitted with a dropping funnel, water condenser, and immersion thermometer. Stirring was effected magnetically. After the apparatus was removed from the dry box, the hydrazine was added to the aminating agent at 0° to 5°C. Workup of the reaction mixture was then performed in a nitrogen atmosphere.

A. Preparation of $CH_3SO_2ONH_2$ (Hydroxylamine-O-methylsulfonate)

Methanesulfonic acid (14.8 g, 0.154 mole) prepared by hydrolysis of methanesulfonyl chloride, and shown to be 100.2 percent pure by acid-base titration, was dissolved in 150 ml of absolute methanol. Potassium hydroxide (1.69 g, 0.155 mole) was dissolved in 30 ml of hot (50°C) absolute methanol and added to a solution of $NH_2OH \cdot CHI$ (10.7 g, 0.154 mole) in 120 ml of absolute methanol. The resulting slurry was cooled to 10°C, the KCl was removed by filtration, and the resulting filtrate was added to the solution of methanesulfonic acid. The mixture was allowed to stand for 1 hour and the methanol removed by vacuum distillation. The recovered solid (18.1 g) was recrystallized from a mixture of 25 ml of methanol and 125 ml of ethanol. The dried product amounted to 13.6 g and melted at 149° to 151°C.

Analysis. Found: C, 10.75; H, 4.50; N, 12.31. Calculated for $CH_3SO_3ONH_2$: C, 10.81; H, 4.54; N, 12.61.

B. Preparation of $N_3H_6SO_3CH_3$ (triazanium methylsulfonate)

Hydrazine (0.45 g, 14 mmoles) and $CH_3SO_2ONH_2$ (1.55 g, 14 mmoles) were dissolved in 40 ml of absolute methanol, and the mixture was reacted at ambient temperature for 16 hours. Diethylether (250 ml) was added to the solution to precipitate a colorless solid [1.40 g, mp 73° to 75°C (decomposes)]. After recrystallization from a 2:1 ethanol-methanol solvent pair, the material melted at 77° to 79°C (decomposes).

Analysis. Found: N, 30.44; H, 6158; N:H, 3.00. Calculated for $N_3H_6SO_3CH_3$: N, 29.35; H, 6.34; N:H, 3.

C. Preparation of $N_3H_6ClO_4 \cdot H_2O$ (triazanium perchlorate monohydrate)

Triazanium methylsulfonate (0.500 g, 3.5 mmoles) was dissolved in $CH_3OH$ (30 ml) and treated with $Ba(ClO_4)_2$ (0.620 g, 1.85 mmoles) dissolved in $CH_3OH$ (10 ml). Turbidity developed within one-half minute, and a precipitate was slowly formed. The mixture was stirred at ambient temperature for 1 hour and filtered through a tared crucible. After drying, the precipitate weighed 0.322 g (calculated, 0.557 g). The filtrate was concentrated to dryness, and 0.88 g of a colorless solid was recovered from the filtrate, melting at 61° to 63°C.

The reaction was repeated in a 5:2 ethanol-methanol mixture to minimize the solubility of $Ba(SO_3CH_3)_2$. A solution of triazanium methylsulfonate (0.403 g, 2.82 mmoles) was dissolved in a mixture of 40 ml of warm absolute methanol and 20 ml of methanol. A solution of $Ba(ClO_4)_2$ (0.479 g, 1.42 mmoles) in 10 ml of ethanol was added to give an immediate precipitate. After 1 hour of reaction, the precipitate (0.355 g; theo., 0.462 g) was removed by filtration. The filtrate yielded 0.525 g of a colorless solid (theo., 0.462 g), melting at 60° to 62°C.

An analytical sample was obtained by recrystallizing the crude product twice from 10 ml of warm ethanol. The recrystallized material melted at 78° to 80°C.

Analysis. Found: C, 0.77; H, 4.67; N, 24.34. Calculated for $N_3H_6ClO_4 \cdot H_2O$: H, 4.87; N, 25.39.

It will readily be seen that the triazanium perchlorate monohydrate, thus produced, is in the same family as ammonium perchlorate and hydrazanium perchlorate, which are widely used as oxidizers in solid propellant fuels and the like. Therefore, it is believed that the triazanium perchlorate monohydrate should also be useful as an oxidizer for such purposes and, in fact, due to its extra NH group, should be more energetic than the other members of this family.

Several additional triazanium salts have also been prepared by the foregoing method.

Obviously, numerous other variations and modifications may be made without departing from the present invention. Accordingly, it should be clearly understood that the forms of the present invention described above are illustrative only and are not intended to limit the scope of the present invention.

I claim:
1. The method of synthesizing triazanium salts comprising the steps of:
   preparing $CH_3SO_3NH_2$ as an aminating agent,
   reacting said aminating agent with hydrazine to form triazanium methylsulfonate, and
   metathetically reacting said triazanium methylsulfonate, with barium perchlorate to produce triazanium perchlorate monohydrate.

* * * * *